United States Patent
Shiau et al.

(10) Patent No.: US 7,527,415 B2
(45) Date of Patent: May 5, 2009

(54) LIGHT GUIDE PLATE AND BACKLIGHT MODULE USING THE SAME

(75) Inventors: Tzeng-Ke Shiau, Hsinchu (TW); Chao-Hung Weng, Hsinchu (TW); Jiun-Chian Liao, Hsinchu (TW); Chih-Jen Tsang, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 12/060,870

(22) Filed: Apr. 2, 2008

(65) Prior Publication Data
US 2009/0040788 A1    Feb. 12, 2009

(30) Foreign Application Priority Data
Aug. 6, 2007    (TW) .............................. 96128827 A

(51) Int. Cl.
*F21V 8/00* (2006.01)
(52) U.S. Cl. ........................ 362/625; 362/623; 362/628
(58) Field of Classification Search ................ 362/600, 362/623, 625, 626, 628
See application file for complete search history.

(56) References Cited

U.S. PATENT DOCUMENTS

| | | | |
|---|---|---|---|
| 5,050,946 A | | 9/1991 | Hathaway et al. |
| 5,197,792 A | * | 3/1993 | Jiao et al. .................... 362/623 |
| 5,779,338 A | * | 7/1998 | Ishikawa et al. ............ 362/625 |
| 6,068,382 A | * | 5/2000 | Fukui et al. ................. 362/625 |
| 2005/0052859 A1 | * | 3/2005 | Lazarev et al. ................ 362/31 |
| 2006/0291253 A1 | | 12/2006 | Kim et al. |

* cited by examiner

*Primary Examiner*—Laura Tso
(74) *Attorney, Agent, or Firm*—Jianq Chyun IP Office

(57) ABSTRACT

A light guide plate has a bottom surface including flat surfaces (FSs) and a plurality of prism patterns (PPs) disposed alternately with the FSs, a light emitting surface (LES) and a light incident surface (LIS). Each FS is at a first distance respectively from the LES and the first distances gradually decrease along a direction away from the LIS. Each PP has a first slanted surface (FSS) and at least a groove having a second slanted surface (SSS) and a third slanted surface (TSS). The two opposite sides of the FSS are spaced out a second distance apart. The two opposite sides of the SSS are spaced out a third distance apart. The specific value of dividing a first orthogonal projection of the second distance on an axis perpendicular to the FSs by a second orthogonal projection of the third distance on the axis is between 0.5 and 1.5.

15 Claims, 6 Drawing Sheets

LIGHT GUIDE PLATE AND BACKLIGHT MODULE USING THE SAME

CROSS-REFERENCE TO RELATED APPLICATION

This application claims the priority benefit of Taiwan application serial no. 96128827, filed on Aug. 6, 2007. The entirety of the above-mentioned patent application is hereby incorporated by reference herein and made a part of this specification.

BACKGROUND OF THE INVENTION

1. Field of the Invention

The present invention generally relates to a backlight module, and more particularly, to a light guide plate (LGP) applied to a backlight module.

2. Description of Related Art

FIG. 1 is a cross-sectional diagram of a conventional backlight module, FIG. 2 is a locally-enlarged cross-sectional diagram of the prism pattern in FIG. 1 and FIG. 3 is a curve chart showing the relationship between the luminance and the light emitting angle of the light emitting surface of the LGP in FIG. 1. Referring to FIG. 1, a backlight module 100 includes a light source 110, a reflective sheet 120 and an LGP 200. The light source 110 is disposed adjacent to a light incident surface 210 of the LGP 200 and the reflective sheet 120 is adjacent to a bottom surface 220 of the LGP 200. The light provided by the light source 110 travels into the LGP 200 through the light incident surface 210 and then travels out through a light emitting surface 230 of the LGP 200, so as to form a planar light source, and then travels to a liquid crystal display panel (LCD panel, not shown herein) on the light emitting surface 230. The reflective sheet 120 may reflect the light to the light emitting surface 230.

Referring to FIGS. 1 and 2, the bottom surface 220 of the LGP 200 has a plurality of flat surfaces 240 and a plurality of prism patterns 250 disposed alternately with the flat surfaces 240, and each prism pattern 250 is composed of a first slanted surface 252, a second slanted surface 254 and a third slanted surface 256. When the light traveling into the LGP 200 through the light incident surface 210 is transmitted to the first slanted surface 252, a part of the light is totally reflected and then travels to the LCD panel through the light emitting surface 230. Referring to FIG. 3, as the light travels out through the light emitting surface 230 (FIG. 1), the luminance of the light between the light emitting angle of −30° and the light emitting angle of 30° is relatively great, so that each distribution curve on the curve chart of luminance vs. light emitting angle has a peak between the light emitting angle of −30° and the light emitting angle of 30°.

Referring to FIGS. 2 and 3 again, each distribution curve in FIG. 3 represents a ratio of a base length c to a base length b. The distribution curves G1-G4 in FIG. 3 respectively represent c:b=1:1, c:b=4:3, c:b=2:1 and c:b=4:1. However, in the conventional LGP 200, each distribution curve has another peak between the light emitting angle of 30° and the light emitting angle of 90°. Therefore, when the conventional LGP 200 is used to provide a planar light source, the light travelling from the light emitting surface 230 is less concentrated and the luminance efficiency thereof is lower.

SUMMARY OF THE INVENTION

The present invention is directed to an LGP and a backlight module using the LGP such that the light after passing the LGP is more concentrated.

Other advantages and objects of the present invention can be further comprehended through the technical features disclosed in the present invention.

To achieve one of, a part of or all of the above-mentioned objectives, or to achieve other objectives, an embodiment of the present invention provides an LGP applied to a backlight module. The LGP has a light emitting surface, a light incident surface adjacent to the light emitting surface and a bottom surface opposite to the light emitting surface and adjacent to the light incident surface. The bottom surface includes a plurality of first flat surfaces and a plurality of prism patterns. Each first flat surface is at a first distance respectively from the light emitting surface, and the first distances gradually decrease along a direction away from the light incident surface. The prism patterns and the first flat surfaces are alternately disposed, and each prism pattern has at least a groove and a first slanted surface. Each groove has a second slanted surface and a third slanted surface. In each prism pattern, the second slanted surface is located between one of the first slanted surfaces and the third slanted surface; the first slanted surface is located between the third slanted surface and another one of the first flat surfaces; the first slanted surface slants relative to the third slanted surface and the first flat surfaces. In each prism pattern, a first side of the first slanted surface adjacent to the light emitting surface is at a second distance from a second side of the first slanted surface far from the light emitting surface, and a third side of the second slanted surface adjacent to the light emitting surface is at a third distance from a fourth side of the second slanted surface far from the light emitting surface. In each prism pattern, a first orthogonal projection of the second distance is formed on an axis perpendicular to the first flat surfaces and a second orthogonal projection of the third distance is formed on the axis, wherein the specific value of dividing the first orthogonal projection by the second orthogonal projection is greater than or equal to 0.5 and less than or equal to 1.5.

To achieve one of, a part of or all of the objectives, or to achieve other objectives, an embodiment of the present invention further provides a backlight module including the LGP and a light source. The light source is disposed adjacent to the light incident surface of the LGP.

Since the LGP has a plurality of prism patterns, and each prism pattern has at least a groove and a slanted surface, the light after passing the LGP is more concentrated such that the LGP has better luminance efficiency.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
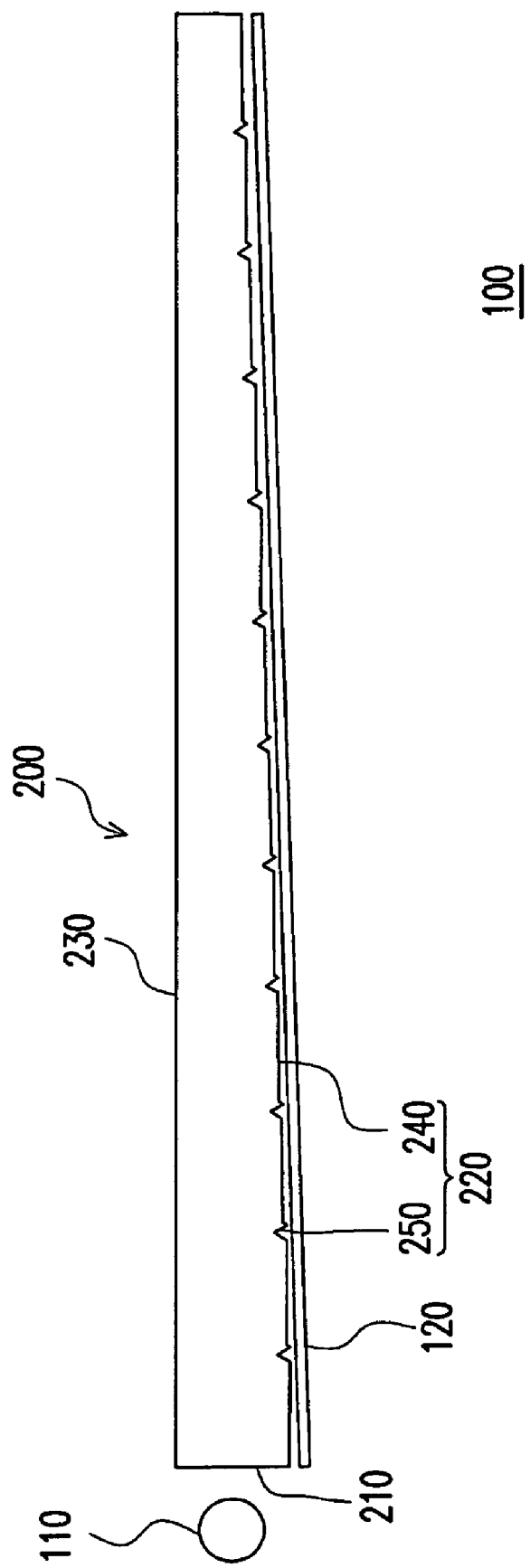
FIG. 1 is a cross-sectional diagram of a conventional backlight module.
Figure 2:
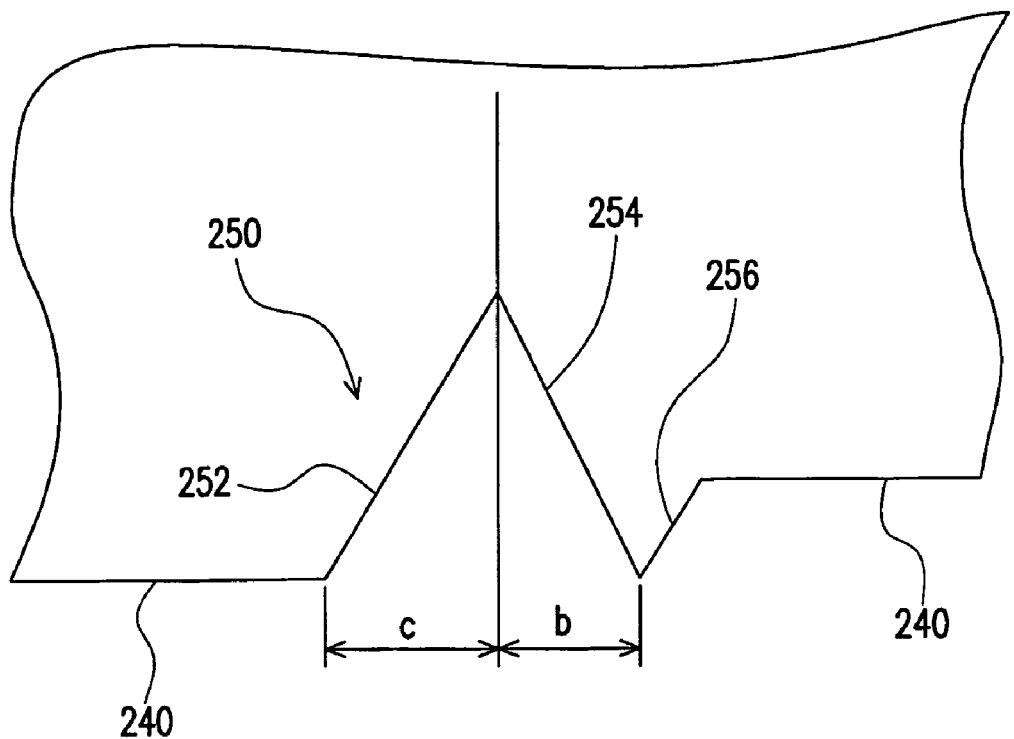
FIG. 2 is a locally-enlarged cross-sectional diagram of the prism pattern in FIG. 1.
Figure 3:
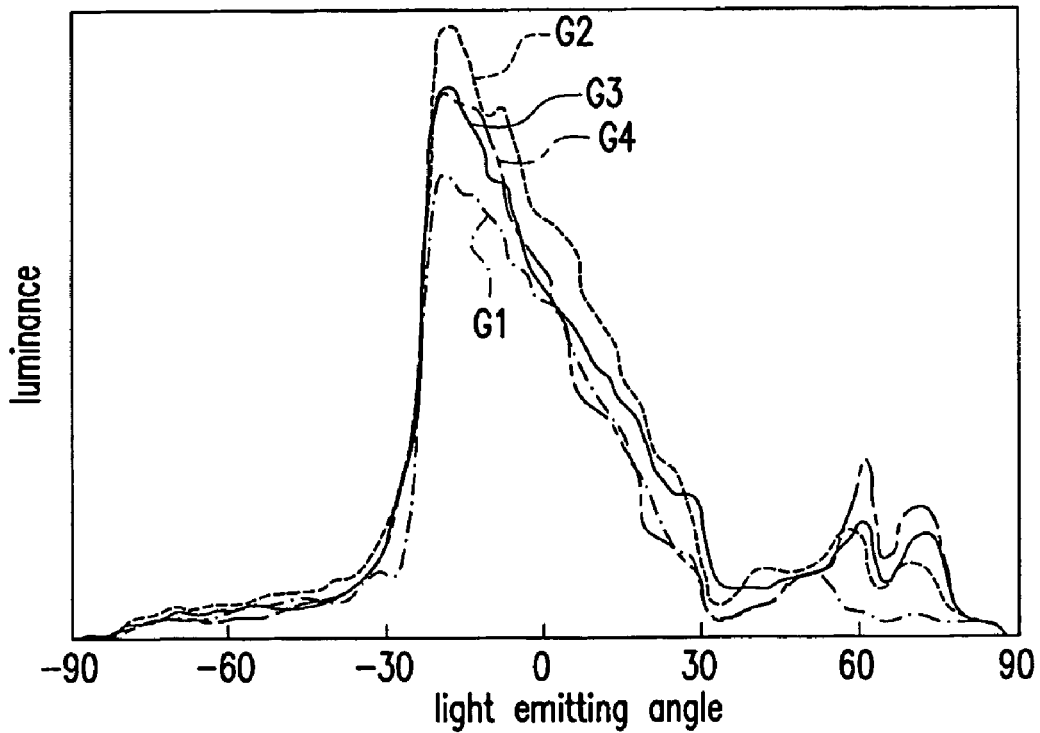
FIG. 3 is a curve chart showing the relationship between the luminance and the light emitting angle of the light emitting surface of the LGP in FIG. 1.
Figure 4A:
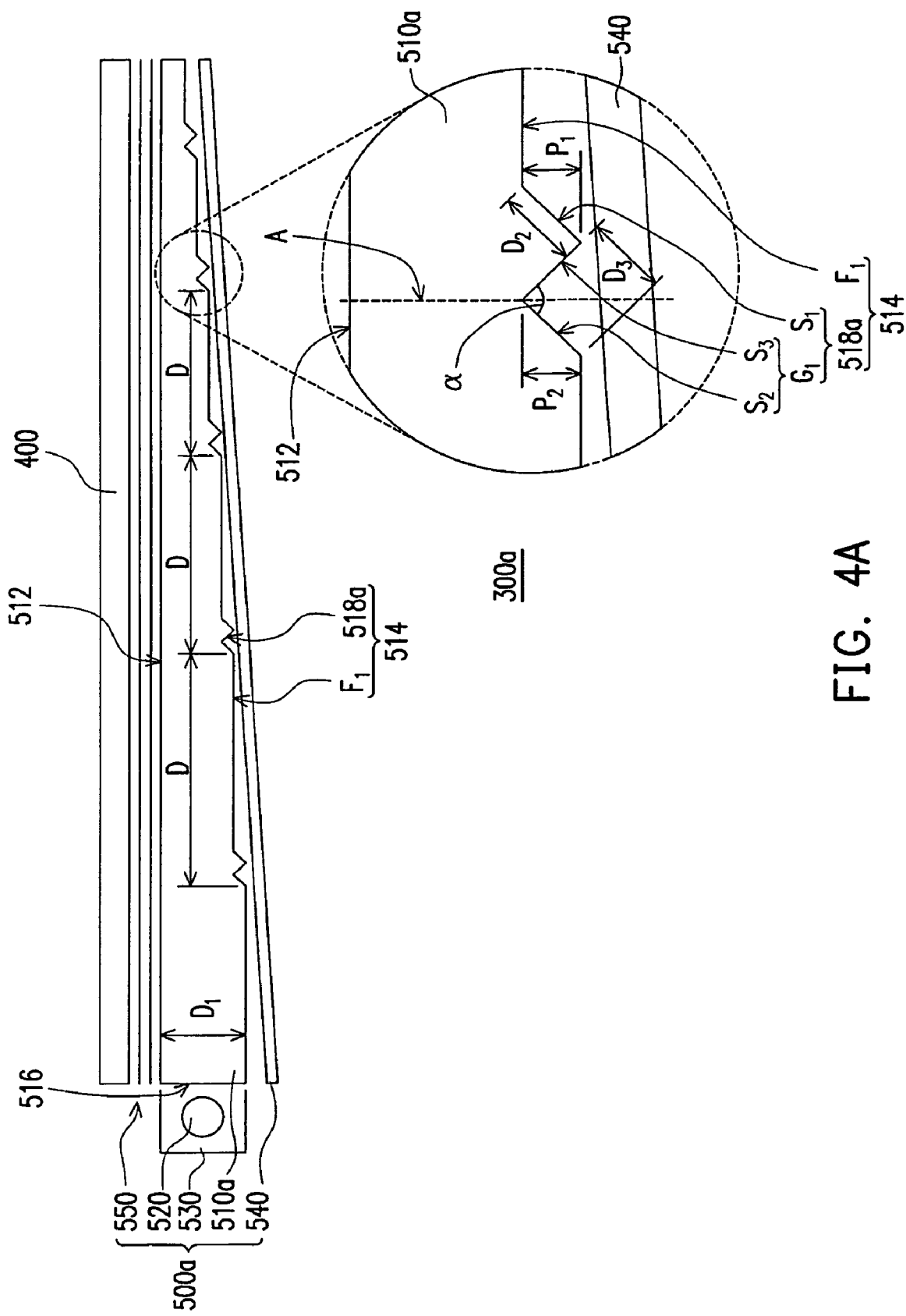
FIG. 4A is a cross-sectional diagram of an LCD according to the first embodiment of the present invention.
Figure 4B:
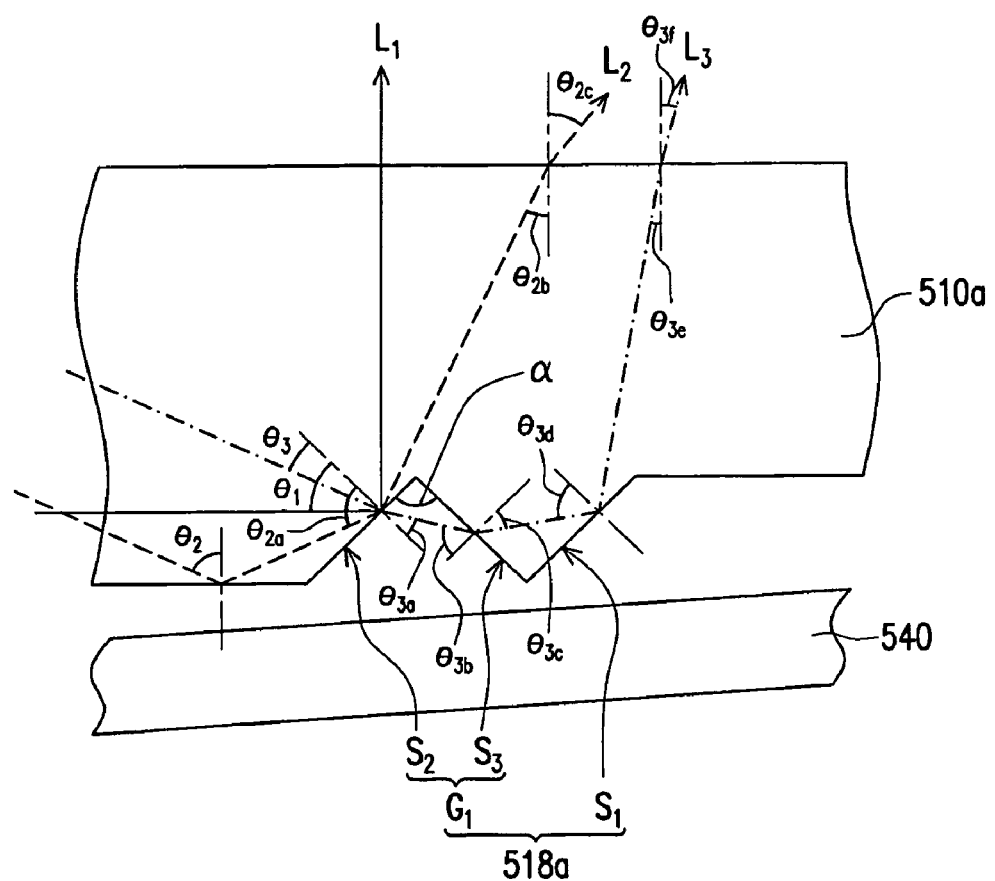
FIG. 4B is a diagram of transmission paths of the light in the LGP of FIG. 4A.
Figure 5:
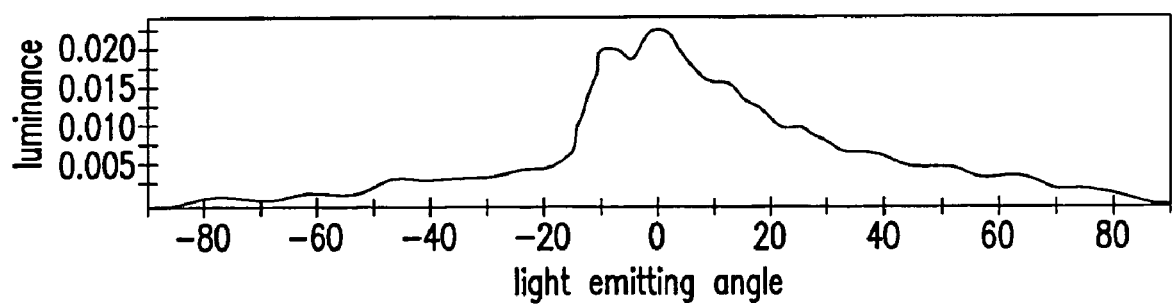
FIG. 5 is a curve chart showing the relationship between the luminance and the light emitting angle of the light emitting surface of the LGP in FIG. 4A.

FIG. 4A is a cross-sectional diagram of a liquid crystal display (LCD) according to the first embodiment of the present invention, FIG. 4B is a diagram of transmission paths of the light in the LGP of FIG. 4A and FIG. 5 is a curve chart showing the relationship between the luminance and the light emitting angle of the light emitting surface of the LGP in FIG. 4A. Referring to FIG. 4A, an LCD 300a includes an LCD panel 400 and a backlight module 500a. The backlight module 500a is disposed at a side of the LCD panel 400 and includes an LGP 510a and a light source 520.

The LGP 510a is, for example, a wedge-type LGP and has a light emitting surface 512 facing the LCD panel 400, a light incident surface 516 adjacent to the light emitting surface 512 and a bottom surface 514 opposite to the light emitting surface 512 and adjacent to the light incident surface 516. The light source 520 is, for example, a cold cathode fluorescent lamp (CCFL) disposed adjacent to the light incident surface 516 to provide light. The light provided by the light source 520 is suitable for travelling into the LGP 510a through the light incident surface 516, and then travelling from the LGP 510a through the light emitting surface 512, so as to form a planar light source required by the LCD panel 400.

In the first embodiment, the backlight module 500a further includes a reflective cover 530, a reflective sheet 540 and an optical film set 550. The reflective cover 530 is disposed adjacent to the light incident surface 516, the light source 520 is located between the light incident surface 516 and the reflective cover 530 and the reflective sheet 540 is disposed adjacent to the bottom surface 514. The optical film set 550 is disposed on the light emitting surface 512 and located between the LCD panel 400 and the LGP 510a. The optical film set 550 is composed of, for example, at least one of a diffusion plate, a prism plate and a brightness enhancing film (BEF). The reflective cover 530 reflects the light provided by the light source 520 so that the light travels into the LGP 510a through the light incident surface 516. The reflective sheet 540 reflects the light travelling into the LGP 510a to the light emitting surface 512 so that the light travels from the LGP 510a through the light emitting surface 512, so as to form the planar light source required by the LCD panel 400. The optical film set 550 uniformizes the light of the planar light source travelling from the light emitting surface 512 and enhances the luminance of the light of the planar light source. The structure and the feature of the LGP 510a are depicted hereinafter.

The bottom surface 514 of the LGP 510a includes a plurality of first flat surfaces $F_1$ and a plurality of prism patterns 518a disposed alternately with the first flat surfaces $F_1$. Each of the first flat surfaces $F_1$ is, for example, parallel to the light emitting surface 512 and at a first distance $D_1$ respectively from the light emitting surface 512. The first distances $D_1$ gradually decrease along a direction away from the light incident surface 516. In other words, the portion of the LGP 510a closest to the light incident surface 516 is the thickest, and the portion thereof farthest from the light incident surface 516 is the thinnest, such that the LGP 510a has a wedge-like outline. A pitch D is between every two adjacent prism patterns 518a. The pitches D gradually decrease along a direction away from the light incident surface 516. In other words, the pitch D closer to the light incident surface 516 is greater, and the pitch D farther from the light incident surface 516 is smaller.

Each of the prism patterns 518a has at least a groove $G_1$ and a first slanted surface $S_1$. Each groove $G_1$ is, for example, a V-shaped groove and has a second slanted surface $S_2$ and a third slanted surface $S_3$. In each groove $G_1$, the second slanted surface $S_2$ is connected between the first flat surface $F_1$ adjacent to the light incident surface 516 and a third slanted surface $S_3$; the first slanted surface $S_1$ is connected between the third slanted surface $S_3$ and the first flat surface $F_1$ far from the light incident surface 516, and the first slanted surface $S_1$ slants relative to the third slanted surface $S_3$ and the first flat surfaces $F_1$.

In each groove $G_1$, a side of the first slanted surface $S_1$ adjacent to the light emitting surface 512 is at a second distance $D_2$ from another side of the first slanted surface $S_1$ far from the light emitting surface 512 (i.e. the width of the first slanted surface $S_1$), and a side of the second slanted surface $S_2$ adjacent to the light emitting surface 512 is at a third distance $D_3$ from another side of the second slanted surface $S_2$ far from the light emitting surface 512 (i.e. the width of the second slanted surface $S_2$). In each groove $G_1$, a first orthogonal projection $P_1$ of the second distance $D_2$ is formed on an axis A perpendicular to the first flat surfaces $F_1$ and a second orthogonal projection $P_2$ of the third distance $D_3$ is formed on the axis A. The specific value of dividing the first orthogonal projection $P_1$ by the second orthogonal projection $P_2$ is greater than or equal to 0.5 and less than or equal to 1.5.

The transmission paths of the light in the LGP 510a may be exemplarily described in association with one of the prism pattern 518a. Referring to FIGS. 4A and 4B, a part of the light traveling into the LGP 510a may pass through the second slanted surface $S_2$ and the third slanted surface $S_3$ of the groove $G_1$ to travel to the first slanted surface $S_1$. After that, the light is totally reflected at the first slanted surface $S_1$ to travel to the light emitting surface 512, so that the light passes through the light emitting surface 512 and travels to the LCD panel 400. Therefore, in comparison with the prior art, the light after passing the LGP 510a is more concentrated.

For example, when the LGP 510a is made of acrylic (polymethylmethacrylate, PMMA), the critical angle at which the light transmitted from the LGP 510a to the air is totally reflected is about 42°. The section of the groove $G_1$ is, for example, V-shaped with two opposite sides equal in length, and has a vertex angle α (the included angle between the second slanted surface $S_2$ and the third slanted surface $S_3$) of 90°. The first orthogonal projection $P_1$ is, for example, equal to the second orthogonal projection $P_2$. As a light $L_1$ travels to the second slanted surface $S_2$ at an incident angle $\theta_1$ of 45°, the light $L_1$ will be totally reflected at the second slanted surface $S_2$. After that, the light $L_1$ travels to the light emitting surface 512 at an incident angle of 0°, and then passes through the light emitting surface 512 to travel to the LCD panel 400 (as shown in FIG. 4A).

As a light $L_2$ travels to the bottom surface 514 at an incident angle $\theta_2$ of 65°, the light $L_2$ is totally reflected at the bottom surface 514. Then, the light $L_2$ travels to the second slanted surface $S_2$ at an incident angle $\theta_{2a}$ of 70° and is totally reflected at the second slanted surface $S_2$. Further, the light $L_2$ travels to the light emitting surface 512 at an incident angle $\theta_{2b}$ of 25°, and then passes through the light emitting surface 512 at an refraction angle $\theta_{2c}$ of about 39.2° to travel to the LCD panel 400 (as shown in FIG. 4A).

In addition, when a light $L_3$ is parallel to the light $L_2$ and travels to the second slanted surface $S_2$ at an incident angle $\theta_3$ of 25°, the light $L_3$ passes through the second slanted surface $S_2$ to travel into the groove $G_1$ at an refraction angle $\theta_{3a}$ of about 30.7°. After that, the light $L_3$ travels to the third slanted surface $S_3$ at an incident angle $\theta_{3b}$ of 59.3°, and then passes through the third slanted surface $S_3$ at an refraction angle $\theta_{3c}$ of about 35.1°. Further, the light $L_3$ travels to the first slanted surface $S_1$ at an incident angle $\theta_{3d}$ of 54.9°, and is totally reflected at the first slanted surface $S_1$. Furthermore, the light $L_3$ travels to the light emitting surface 512 at an incident angle $\theta_{3e}$ of 9.9°, and then passes through the light emitting surface 512 at an refraction angle $\theta_{3f}$ of about 14.9° to travel to the LCD panel 400 (as shown in FIG. 4A).

In comparison with the prior art, in the first embodiment, since the light $L_3$ passes through the second slanted surface $S_2$ and the third slanted surface $S_3$ to travel to the first slanted surface $S_1$ and then the light $L_3$ is totally reflected at the first slanted surface $S_1$ to travel to the light emitting surface 512, as a whole, the LGP 510a has better luminance efficiency. Referring to FIG. 5, as the light passes through the LGP 510a, the luminance of the light between the light emitting angle of −30° and the light emitting angle of 20° is relatively great so that the distribution curve on the curve chart of luminance vs. light emitting angle has only a peak between the light emitting angle of −30° and the light emitting angle of 20°, and the distribution curve has no other peaks. Thus, as a whole, the light passing the LGP 510a is more concentrated.

However, the above-described embodiment is not to limit the present invention. For example, each vertex angle α (the included angle between the second slanted surface $S_2$ and the third slanted surface $S_3$ of each groove $G_1$) is not limited to be 90° and an optimum design of each vertex angle α can be conducted on the basis of the material of the LGP 510a and other design conditions. Moreover, the light emitting surface 512 of the LGP 510a is allowed to have a plurality of microstructures, and the section of each microstructure is in a shape of V, prism, trapezoid or other polygons, so that the light provided by the light source 520 has higher luminance when passing through the LGP 510a to form the planar light source.

The Second Embodiment

Figure 6:
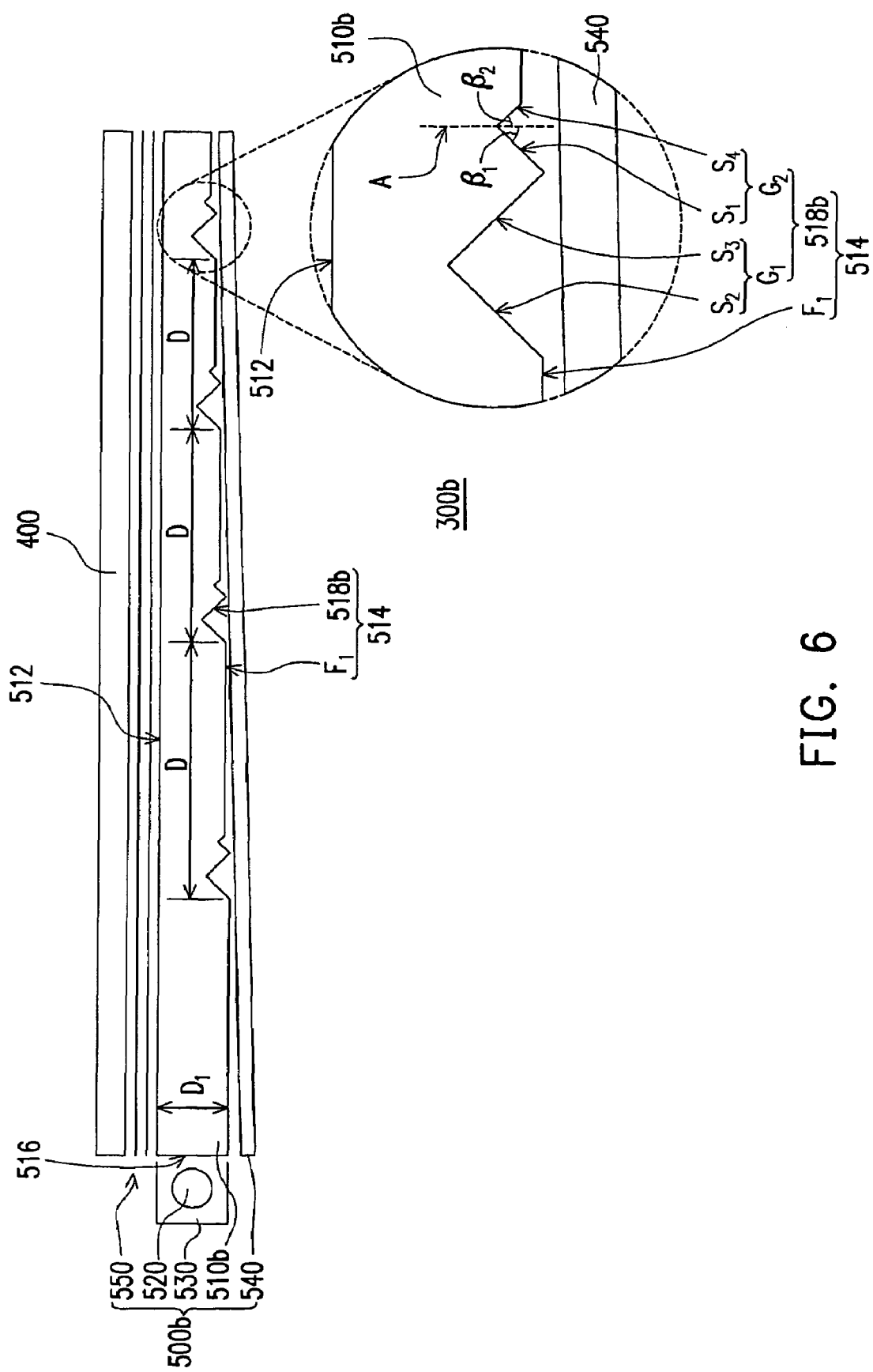
FIG. 6 is a cross-sectional diagram of an LCD according to the second embodiment of the present invention.

FIG. 6 is a cross-sectional diagram of an LCD according to the second embodiment of the present invention. Referring to FIG. 6, the structure of an LCD 300b is similar to that of an LCD 300a in FIG. 4A, but the difference between the LCD 300b and the LCD 300a is that in a backlight module 500b of the LCD 300b, prism patterns 518b of an LGP 510b are different from prism patterns 518a of the LGP 510a.

In the second embodiment, each prism pattern 518b includes a fourth slanted surface $S_4$, which is located between the first slanted surface $S_1$ of the same prism pattern 518b and the first flat surface $F_1$ farther from the light incident surface 516. In each prism pattern 518b, a second acute angle $\beta_2$ between the fourth slanted surface $S_4$ and the axis A is, for example, greater than a first acute angle $\beta_1$ between the first slanted surface $S_1$ and the axis A. In each prism pattern 518b, the fourth slanted surface $S_4$ slants relative to the first flat surfaces $F_1$ and together with the corresponding first slanted surface $S_1$ form another groove $G_2$ with a V-shaped section. Each prism pattern 518b includes two grooves $G_1$ and $G_2$ (V-shaped grooves) closely adjacent to each other.

In comparison with the prior art, in one of the prism patterns 518b in the second embodiment, a part of the light traveling into the LGP 510b passes through the second slanted surface $S_2$ and the third slanted surface $S_3$ of the groove $G_1$ to travel to the first slanted surface $S_1$ of the groove $G_2$, and the part of the light is totally reflected at the first slanted surface $S_1$ to travel to the light emitting surface 512 and then passes through the light emitting surface 512 to travel to the LCD panel 400. Therefore, as a whole, the light after passing the LGP 510b not only is more concentrated, but also has better luminance efficiency.

The Third Embodiment

Figure 7:
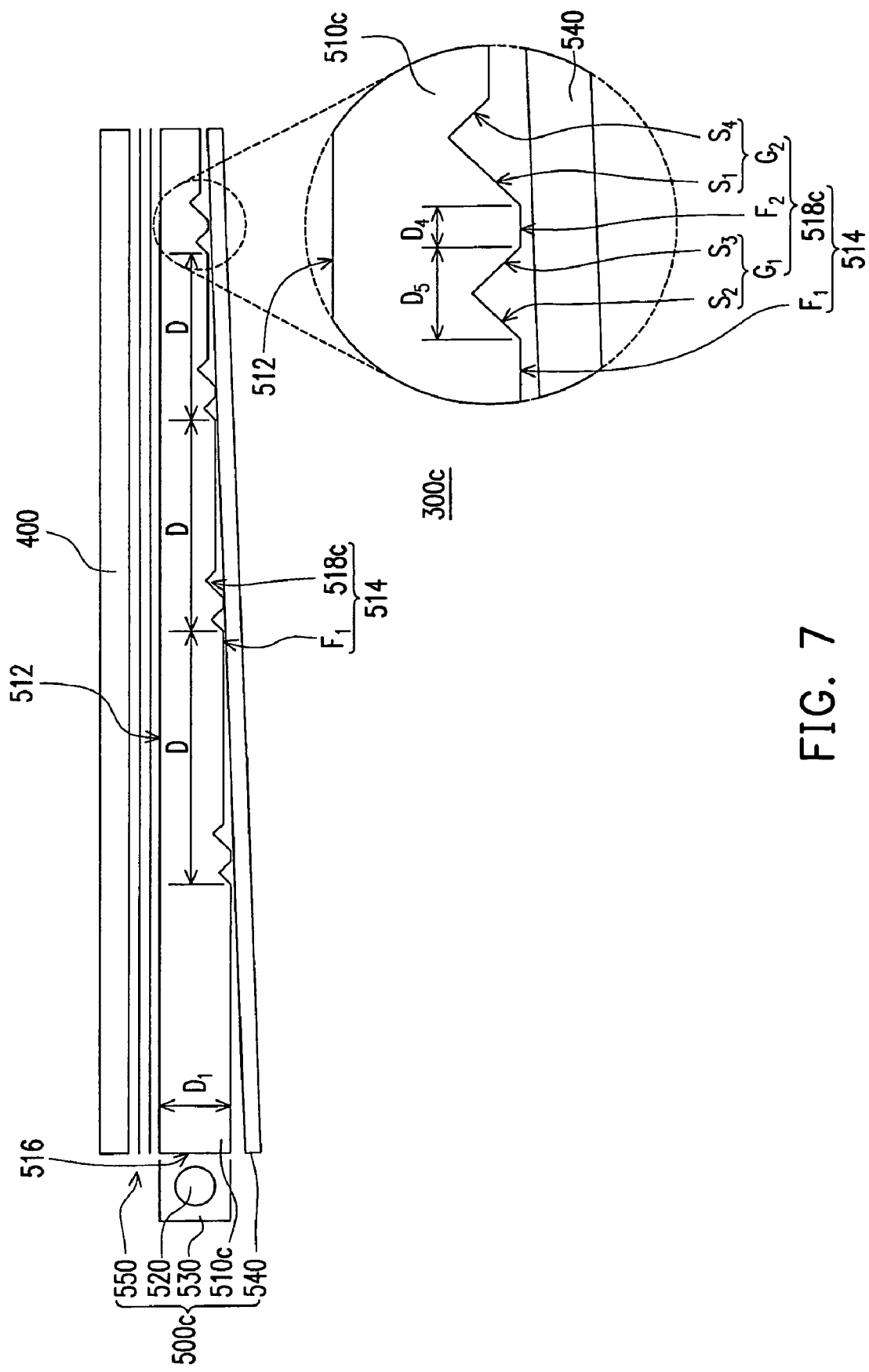
FIG. 7 is a cross-sectional diagram of an LCD according to the third embodiment of the present invention.

FIG. 7 is a cross-sectional diagram of an LCD according to the third embodiment of the present invention. Referring to FIG. 7, the structure of an LCD 300c is similar to that of the LCD 300b in FIG. 6, but the difference between the LCD 300c and the LCD 300b is that in a backlight module 500c of the LCD 300c, prism patterns 518c of the LGP 510c are different from the prism patterns 518b of the LGP 510b.

In the third embodiment, each prism pattern 518c further includes a second flat surface $F_2$. In each prism pattern 518c, the second flat surface $F_2$ is connected between the third slanted surface $S_3$ of the groove $G_1$ and the first slanted surface $S_1$ of the groove $G_2$, and a side of the second flat surface $F_2$ adjacent to the light incident surface 516 is at a fourth distance $D_4$ (i.e. the width of the second flat surface $F_2$) from another side of the second flat surface $F_2$ far from the light incident surface 516. In each of the prism patterns 518c, a side of the second flat surface $F_2$ far from the light emitting surface 512 is at a fifth distance $D_5$ (i.e. the opening width of the groove $G_1$) from a side of the third slanted surface $S_3$ far from the light emitting surface 512. The specific value of dividing the fourth distance $D_4$ by the fifth distance $D_5$ is greater than 0 and less than or equal to 1.

In comparison with the prior art, in one of the prism patterns 518c in the third embodiment, a part of the light traveling into the LGP 510c passes through the second slanted surface $S_2$ and the third slanted surface $S_3$ of the groove $G_1$ to travel to the first slanted surface $S_1$ of the groove $G_2$, and the part of the light is totally reflected at the first slanted surface $S_1$ to travel to the light emitting surface 512 and then passes through the light emitting surface 512 to travel to the LCD panel 400. Therefore, as a whole, the light after passing the LGP 510c not only is more concentrated, but also has better luminance efficiency.

In summary, since the LGP has a plurality of prism patterns, and each prism pattern has at least a groove and a slanted surface, the light after passing the LGP is more concentrated so that the LGP has better luminance efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby enabling persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate applied to a backlight module, comprising:

a light emitting surface;

a light incident surface, adjacent to the light emitting surface; and a bottom surface, opposite to the light emitting surface and adjacent to the light incident surface, comprising:

a plurality of first flat surfaces, wherein each of the first flat surfaces is at a first distance respectively from the light emitting surface, and the first distances gradually decrease along a direction away from the light incident surface; and a plurality of prism patterns, disposed alternately with the first flat surfaces, wherein each of the prism patterns has at least a groove and a first slanted surface and further comprises a fourth slanted surface located between the first slanted surface of the same prism pattern and one of the first flat surfaces, the groove has a second slanted surface and a third slanted surface, the second slanted surface is located between one of the first flat surfaces and the third slanted surface, the first slanted surface is located between the third slanted surface and another one of the first flat surfaces, the first slanted surface slants relative to the third slanted surface and the first flat surfaces, a first side of the first slanted surface adjacent to the light emitting surface is at a second distance from a second side of the first slanted surface far from the light emitting surface, a third side of the second slanted surface adjacent to the light emitting surface is at a third distance from a fourth side of the second slanted surface far from the light emitting surface, a first orthogonal projection of the second distance is formed on an axis perpendicular to the first flat surfaces, a second orthogonal projection of the third distance is formed on the axis, and the specific value of dividing the first orthogonal projection by the second orthogonal projection is greater than or equal to 0.5 and less than or equal to 1.5.

2. The light guide plate according to claim 1, wherein in each prism pattern, a second acute angle between the fourth slanted surface and the axis is greater than a first acute angle between the first slanted surface and the axis.

3. The light guide plate according to claim 1, wherein each of the prism patterns further comprises a second flat surface located between the third slanted surface of the same prism pattern and the first slanted surface of the same prism pattern, a fifth side of the second flat surface adjacent to the light incident surface is at a fourth distance from a sixth side of the second flat surface far from the light incident surface, the fourth side is at a fifth distance from a seventh side of the third slanted surface far from the light emitting surface, and the specific value of dividing the fourth distance by the fifth distance is greater than or equal to 0 and less than or equal to 1.

4. The light guide plate according to claim 1, wherein a pitch is between each two adjacent prism patterns, and the pitches gradually decrease along a direction away from the light incident surface.

5. The light guide plate according to claim 1, wherein the light guide plate is a wedge-type light guide plate.

6. A backlight module, comprising:

a light guide plate, having a light emitting surface, a light incident surface and a bottom surface, wherein the light incident surface is adjacent to the light emitting surface, the bottom surface is opposite to the light emitting surface and adjacent to the light incident surface, and the bottom surface comprises:

a plurality of first flat surfaces, wherein each of the first flat surfaces is at a first distance respectively from the light emitting surface, and the first distances gradually decrease along a direction away from the light incident surface; and a plurality of prism patterns, disposed alternately with the first flat surfaces, wherein each of the prism patterns has at least a groove and a first slanted surface and further comprises a fourth slanted surface located between the first slanted surface of the same prism pattern and one of the first flat surfaces, the groove has a second slanted surface and a third slanted surface, the second slanted surface is located between one of the first flat surfaces and the third slanted surface, the first slanted surface is located between the third slanted surface and another one of the first flat surfaces, the first slanted surface slants relative to the third slanted surface and the first flat surfaces, a first side of the first slanted surface adjacent to the light emitting surface is at a second distance from a second side of the first slanted surface far from the light emitting surface, a third side of the second slanted surface adjacent to the light emitting surface is at a third distance from a fourth side of the second slanted surface far from the light emitting surface, a first orthogonal projection of the second distance is formed on an axis perpendicular to the first flat surfaces, a second orthogonal projection of the third distance is formed on the axis, and the specific value of dividing the first orthogonal projection by the second orthogonal projection is greater than or equal to 0.5 and less than or equal to 1.5; and a light source, disposed adjacent to the light incident surface.

7. The backlight module according to claim 6, wherein in each prism pattern, a second acute angle between the fourth slanted surface and the axis is greater than a first acute angle between the first slanted surface and the axis.

8. The backlight module according to claim 6, wherein each of the prism patterns further comprises a second flat surface located between the third slanted surface of the same prism pattern and the first slanted surface of the same prism pattern, a fifth side of the second flat surface adjacent to the light incident surface is at a fourth distance from a sixth side of the second flat surface far from the light incident surface, the fourth side is at a fifth distance from a seventh side of the third slanted surface far from the light emitting surface, and the specific value of dividing the fourth distance by the fifth distance is greater than or equal to 0 and less than or equal to 1.

9. The backlight module according to claim 6, wherein a pitch is between each two adjacent prism patterns, and the pitches gradually decrease along a direction away from the light incident surface.

10. The backlight module according to claim 6, wherein the light guide plate is a wedge-type light guide plate.

11. The backlight module according to claim 6, wherein the light source comprises a cold cathode fluorescent lamp.

12. The backlight module according to claim 6, further comprising an optical film set disposed on the light emitting surface.

13. The backlight module according to claim 12, wherein the optical film set comprises at least one of a diffusion plate, a prism plate and a brightness enhancing film.

14. The backlight module according to claim 6, further comprising a reflective cover disposed adjacent to the light incident surface, and wherein the light source is located between the light incident surface and the reflective cover.

15. The backlight module according to claim 6, further comprising a reflective sheet disposed adjacent to the bottom surface.

* * * * *